United States Patent
Foschiano et al.

(10) Patent No.: US 8,327,014 B2
(45) Date of Patent: Dec. 4, 2012

(54) MULTI-LAYER HARDWARE-BASED SERVICE ACCELERATION (MHSA)

(75) Inventors: Marco Foschiano, Pinerolo (IT); Sudheer Babu Chittireddy, Karnataka (IN); Christophe Paggen, Neupré (BE); Munawar Hossain, Austin, TX (US); Suresh Gurajapu, Cupertino, CA (US); Vardarajan Venkatesh, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 12/164,631

(22) Filed: Jun. 30, 2008

(65) Prior Publication Data

US 2009/0327514 A1    Dec. 31, 2009

(51) Int. Cl.
*G06F 15/16* (2006.01)
(52) U.S. Cl. ......... 709/232; 370/229; 370/351; 370/389
(58) Field of Classification Search .................. 370/230, 370/412, 463, 235; 709/211, 239
See application file for complete search history.

(56) References Cited

U.S. PATENT DOCUMENTS

| | | | | |
|---|---|---|---|---|
| 6,826,615 B2* | 11/2004 | Barrall et al. | ................ | 709/227 |
| 6,975,628 B2* | 12/2005 | Johnson et al. | ................ | 370/389 |
| 7,251,245 B2* | 7/2007 | Oman | ........................... | 370/392 |
| 7,389,462 B1* | 6/2008 | Wang et al. | .................... | 714/748 |
| 7,460,473 B1* | 12/2008 | Kodama et al. | ................ | 370/230 |
| 7,474,670 B2* | 1/2009 | Nowshadi | ..................... | 370/462 |
| 7,594,002 B1* | 9/2009 | Thorpe et al. | ................. | 709/219 |
| 7,636,372 B2* | 12/2009 | Fan et al. | ....................... | 370/463 |
| 7,804,785 B2* | 9/2010 | Roberts et al. | ................ | 370/252 |
| 2003/0158906 A1* | 8/2003 | Hayes | ........................... | 709/211 |
| 2004/0052241 A1* | 3/2004 | Martin et al. | ................. | 370/351 |
| 2005/0135396 A1* | 6/2005 | McDaniel et al. | ............. | 370/412 |
| 2009/0292850 A1* | 11/2009 | Barrall et al. | ................. | 710/301 |

* cited by examiner

*Primary Examiner* — Dustin Nguyen
(74) *Attorney, Agent, or Firm* — Patterson & Sheridan, LLP (57) ABSTRACT

Methods and apparatus for intelligent sharing and tighter integration between a service engine (SE) for network communication and a high-speed forwarding device, such that certain network flows may be offloaded from the SE to benefit from the high-speed forwarding capacity of such a device are provided. To accomplish the integration, an application binary interface (ABI) may be employed as an in-band high-priority communication protocol between the data planes of the SE and the high-speed forwarding device, and an application programming interface (API) may be utilized to leverage the ABI and any in-band or out-of-band channel to allow the master SE to control the high-speed slave device. Such integration techniques are not limited to a few specialized hardware components, but may also be applied to other types of hardware resources, such as flow tables, quality of service (QoS) tables, access control list (ACL) tables for security, forwarding and adjacency tables, etc.

17 Claims, 5 Drawing Sheets

MULTI-LAYER HARDWARE-BASED SERVICE ACCELERATION (MHSA)

BACKGROUND OF THE INVENTION

1. Field of the Invention

Embodiments of the present invention generally relate to the field of network communication and, more particularly, to combining the benefits of a specialized service engine (SE) and the raw power of a high-speed forwarding device with intelligent sharing for tighter device integration.

2. Description of the Related Art

Networking devices for routing network traffic may comprise a service engine or appliance and one or more switch modules. While the service engine may contain a sophisticated processor for managing numerous tasks including handling new network connections and applying certain network policies, the switch modules are typically designed with one goal in mind: to route network traffic quickly and efficiently. Despite the increases in switch performance over the years with application specific integrated circuits (ASICs) geared towards these forwarding devices' specialty, the high-speed forwarding capacity of many switch modules remains largely untapped for applying SE-supported network services (e.g., policies) at much higher performance levels.

Accordingly, techniques for increased forwarding performance and network policy enforcement performance are needed.

OVERVIEW

Embodiments of the present invention generally relate to network traffic processing acceleration by intelligent sharing and tighter integration between a service engine (SE) and specialized hardware components of a networking device. For example, some embodiments may relate to offloading certain network flows from the SE of a networking device to a high-speed forwarding device for increased device performance. Embodiments of the present invention generally provide methods and apparatus for the discrete SE and forwarding devices in the networking device to work as a unified high-performance networking device to apply forwarding and network policies both at control and data planes and for the SE to use the forwarding device hardware resources as virtual hardware resources to be used at one of the switching layers.

One embodiment of the present invention provides an apparatus. The apparatus generally includes a device for network communication. The device generally includes a high-speed forwarding device and a service engine coupled to the high-speed forwarding device and configured to handle network flows, wherein the high-speed forwarding device is capable of higher speed forwarding than the service engine and wherein the service engine offloads a portion of the network flows to be handled by the high-speed forwarding device.

Another embodiment of the present invention provides a method. The method generally includes using a slow path of a service engine for network flow of a new network connection, making a forwarding decision to use an ultra fast path of a high-speed forwarding device coupled to the service engine instead of the slow path for the network flow if the new network connection meets one or more criteria or to use a fast path of the service engine instead of the slow path if the new network connection does not meet the criteria, and using the ultra fast path or the fast path for the network flow according to the forwarding decision.

Yet another embodiment of the present invention provides a computer-readable medium containing a program for determining a forwarding path for a new network connection, which, when executed by a processor, performs certain operations. The operations generally include using a slow path of an SE for network flow of the new network connection, making a forwarding decision to use an ultra fast path of a high-speed forwarding device coupled to the service engine instead of the slow path for the network flow if the new network connection meets one or more criteria or to use a fast path of the service engine instead of the slow path if the new network connection does not meet the criteria, and using the ultra fast path or the fast path for the network flow according to the forwarding decision.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Embodiments of the present invention provide networking apparatus and techniques for intelligent sharing and tighter integration between a service engine (SE) for network communication and a high-speed forwarding device, such that certain network flows may be offloaded from the SE to benefit from the high-speed forwarding capacity of such a device, thereby increasing the performance of the networking apparatus. To accomplish the integration for some embodiments, an application binary interface (ABI) may be employed as an in-band high-priority communication protocol between the data planes of the SE and the high-speed forwarding device, and an application programming interface (API) may be utilized to leverage the ABI and any in-band or out-of-band channel to allow the master SE to control the high-speed slave device. In general, such integration techniques are not limited to a few specialized hardware components (e.g., high-speed switch hardware) since they may also be applied to numerous common types of hardware resources, such as flow tables, quality of service (QoS) tables, access control list (ACL) tables for security, forwarding and adjacency tables, buffer memories, general purpose registers, etc.

As used herein, a service engine (SE) generally refers to a specialized device for use on a network dedicated to performing certain applications, as opposed to a general purpose computer. For example, an SE may provide load balancing, intrusion prevention, advanced QoS, and/or firewall capabilities. An example of an SE includes the PIX firewall, a security appliance designed to protect IP (Internet Protocol) networks from unwanted inbound traffic. An SE may also be known as a service device, a service appliance, a server appliance, a network appliance, an Internet appliance, a service blade, a service card, an embedded service ASIC (application specific integrated circuit), or an embedded service processor. Hereinafter, these shall be referred to as a service engine.

Also as used herein, a high-speed forwarding device generally refers to specialized hardware intended to route network traffic at typically faster speeds than other forwarding-capable hardware. Whereas an SE's embedded service processors may have limited per-connection forwarding capacity, a high-speed forward device may possess one or more switching ASICs designed for much more forwarding capacity. A high-speed forwarding device may also be known as a switching node, switch hardware, a switch linecard or blade, a switch module, and a forwarding node. Hereinafter, these shall be referred to as a high-speed forwarding device.

An Example Networking Device

Figure 1A:
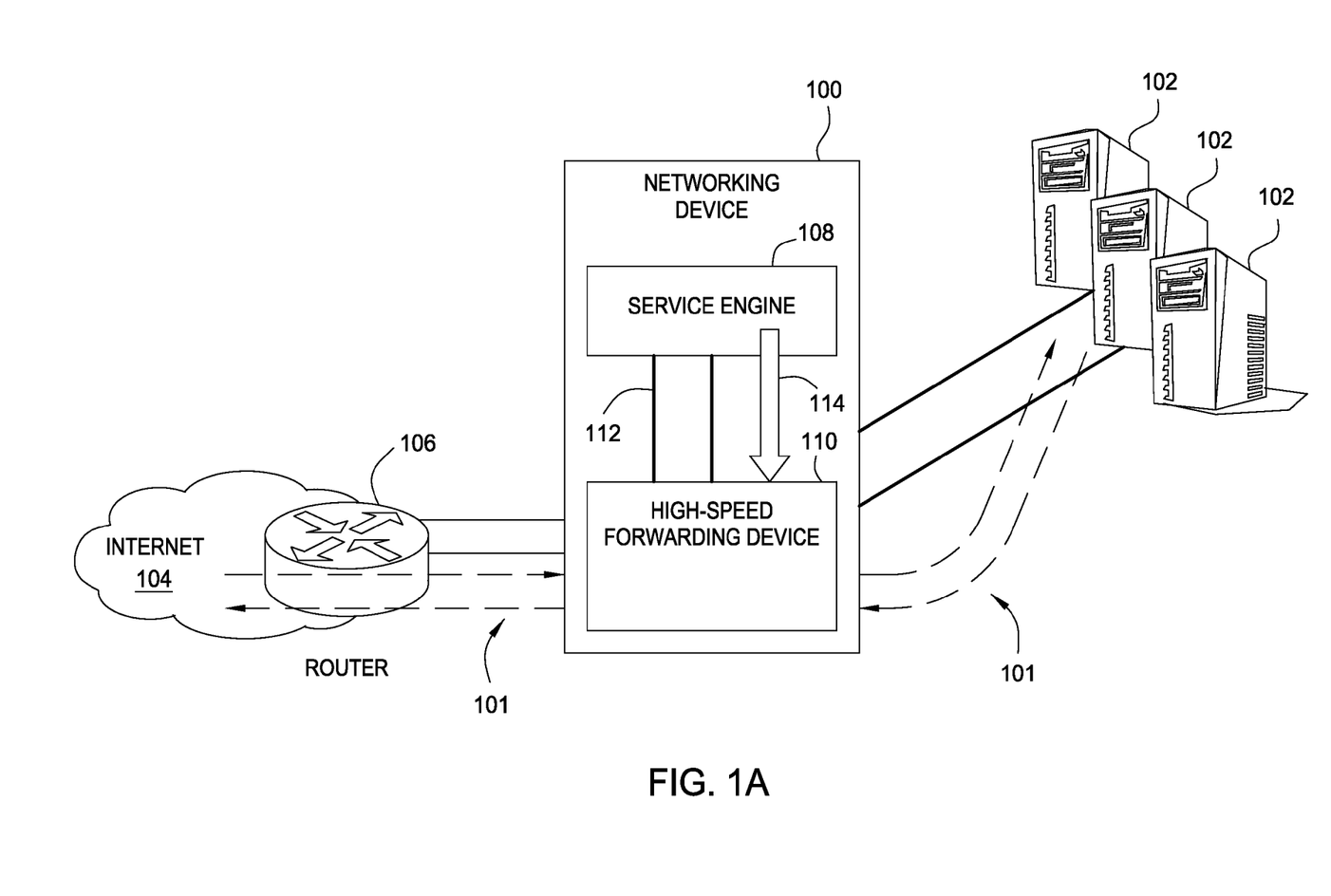
FIGS. 1A and 1B illustrate a tightly integrated networking device implementing multi-layer hardware-based service acceleration (MHSA) for routing network traffic between hosts and the Internet, in accordance with embodiments of the present invention.

FIG. 1A illustrates a networking device 100 (e.g., a networking platform or data center) that may benefit from tighter integration and intelligent sharing according to a multi-layer hardware-based service acceleration (MHSA) scheme as described herein. Employed for forwarding network traffic 101 between one or more hosts 102 and the Internet 104 via a router 106, for example, the networking device 100 may comprise a service engine (SE) 108 coupled to a high-speed forwarding device 110 through one or more interfaces, represented as interface 112 in FIG. 1A. The interface 112 may comprise in-band and/or out-of-band channels. One example of a networking device is the Catalyst 6500 manufactured by Cisco Systems, Inc. of San Jose, Calif.

According to MHSA as described in greater detail below, an SE 108 may function as a master device, taking ownership of portions of the high-speed forwarding device 110, which functions as a slave entity in this case. The high-speed forwarding device may most likely contain efficient, message-based, fully-automated forwarding table programming and purging logic, perhaps in an ASIC or a field programmable gate array (FPGA). Network flow entries may be stored in the forwarding table logic, such as in the NetFlow table on the PFC (Policy Feature Card) of the Catalyst 6500. To facilitate high-speed lookups for flow entries, a special piece of high-speed lookup memory called ternary content addressable memory (TCAM) may be used. The SE 108 may elect to offload only certain flows of network traffic to the high-speed forwarding device 110 in a direction 114. The SE's decision may be based on pre-configured criteria (e.g., protocol and/or transaction type) and related configurable thresholds, such that short and/or tough-to-handle flows may remain with the SE 108, whereas long, relatively simple, and/or bandwidth-consuming flows may be fully or partially offloaded to be hardware-switched by the high-speed forwarding device 110.

Figure 1B:
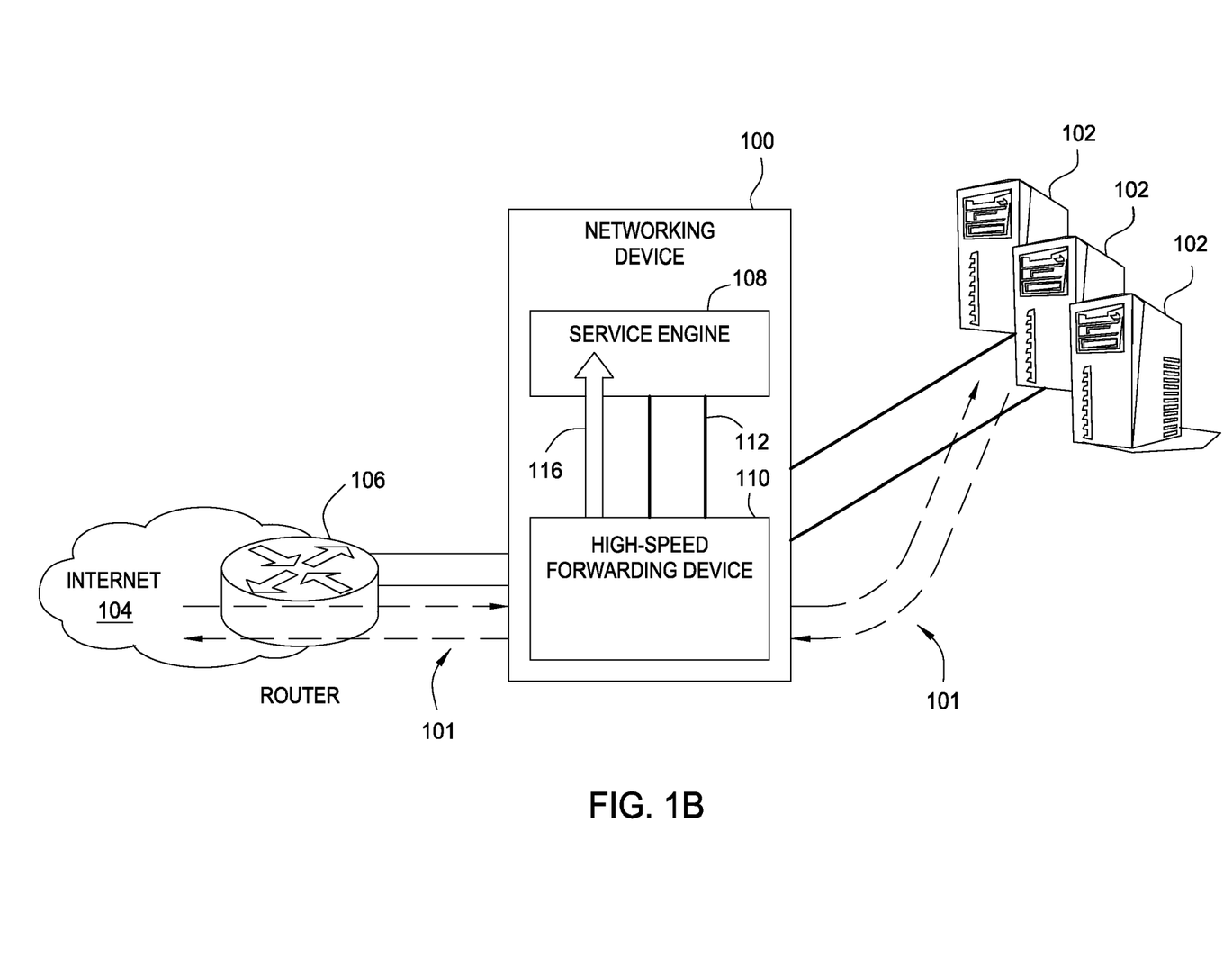

Referring now to FIG. 1B, MHSA may also be used in the opposite direction 116 in an effort to export hardware information (e.g., statistics) from the hardware tables of the high-speed forwarding device 110 and direct it to the SE 108 to be reconciled with other SE data (e.g., statistics of non-offloaded packets).

The MHSA approach is very generic and may be applied to various types of SEs functioning as master devices, such as service blades, appliances, and embedded service ASICs (and their associated control planes). The MHSA technique may also be applied to numerous types of hardware resources (slaves), such as NetFlow and other types of flow tables, QoS tables, ACL tables for security, packet-based or byte-based policer tables, adjacency tables, service modules (e.g., for server load balancing, frame managing, or fire-walling services), etc.

An Example SE/Forwarding Device Integration

Conventionally in a service engine (SE), new network connections are handled at high speeds in the flow-setup path (the so-called "slow path," relatively speaking) of the SE. Once a forwarding decision is made for a particular connection, a shortcut is typically created in the SE's so-called "fast path," a less complex data path for applying repetitive high-speed operations. Subsequent packets for that connection then take the shortcut through the fast path. However, the overall system throughput remains limited by the maximum performance of the SE. Usually, this forwarding limit is significantly smaller than the aggregate capacity of the one or more high-speed forwarding devices in a networking device.

Figure 2:
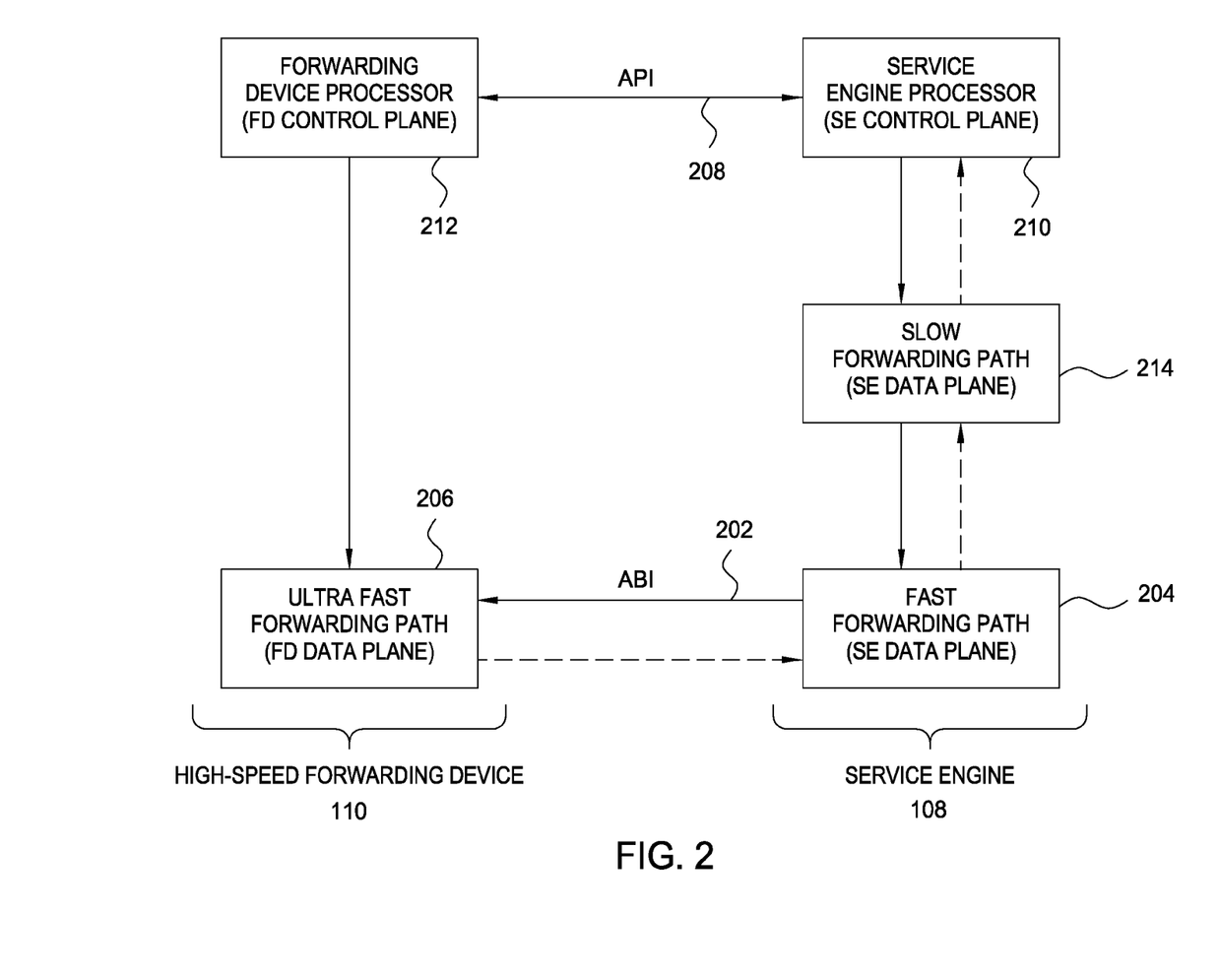
FIG. 2 illustrates a block diagram of a service engine (SE) integrated with a high-speed forwarding device through an application binary interface (ABI), which may be leveraged by an application programming interface (API) communicating between the control planes of the high-speed forwarding device and the SE, in accordance with an embodiment of the present invention.

Therefore, in accordance with the MHSA scheme, FIG. 2 illustrates a block diagram 200 of an SE 108 tightly integrated with a high-speed forwarding device 110 in both the data and control planes in an effort to promote intelligent offloading of certain network flows from the SE 108 to the high-speed forwarding device 110, among other features. To benefit from various efficient message-based fully-automated hardware programming logic mechanisms of the high-speed forwarding device 110, the MHSA architecture may utilize a hardware abstraction layer (HAL) in an effort to abstract the specifics of each high-speed forwarding device from the high-level software control logic.

High-speed hardware programming may be accomplished by employing an in-band high priority communication protocol with a programmatic application binary interface (ABI) 202, for example, between any high-level entity (e.g., a central processing unit or a service processor) in the SE and the efficient message-based fully-automated forwarding table logic. In FIG. 2, the ABI 202 is illustrated as providing efficient direct communication between the fast forwarding path 204 in the data plane of the SE 108 and an "ultra fast" forwarding path 206 (i.e., a wire-speed path) in the data plane of the high-speed forwarding device 110. In conventional network devices, the SE processor 210 does not directly interact with or send messages to the ultra fast forwarding path 206.

The ABI 202 and any in-band or out-of-band communication channel may be leveraged by an application programming interface (API) 208 in an effort to communicate directly and efficiently between the high-speed switch forwarding device 110 and the SE 108. In FIG. 2, the API is illustrated as providing direct communication between the SE processor 210 in the control plane of the SE 108 and the forwarding device processor 212 in the control plane of the high-speed forwarding device 110. The communication protocol the ABI/API approach relies upon may support addressing of each internal entity so as to allow for efficient direct communication. In this case, each software or hardware component may be addressable with a special unicast address, whereas certain categories of components may be addressable as a whole through a multicast address. For some embodiments, generic notifications may also be sent as broadcast messages to all addressable entities.

With the architecture of FIG. 2, the SE 108 may function as a master with the high-speed forwarding device 110 acting as a slave device. New network connections may be initially handled in the slow forwarding path 214 of the SE data plane as described above. For a given new connection, a forwarding decision may be made whether to create a shortcut in the fast forwarding path 204 of the SE data plane or to offload traffic for the new network connection to the ultra fast forwarding path 206 of the forwarding device (FD) data plane according to MHSA. The forwarding decision may be based on one or more criteria, such as protocol or transaction type of the network flows, and on related configurable thresholds. In this manner, shorter and/or more complex network flows may most likely be handled by the SE 108 in the slow or the fast forwarding paths 214, 204, while longer, simpler, and/or more bandwidth-consuming flows may be fully or partially offloaded to the high-speed forwarding device 110 utilizing the ultra fast forwarding path 206.

In this manner, the hierarchy of forwarding hardware (e.g., ASICs and processors) may be realized as a multi-tier architecture according to an MHSA approach, with one tier (e.g., the slow forwarding path 214) for handling ultra complex forwarding, a second tier comprising a number of fast devices (e.g., the fast forwarding path 204) to handle high-to-medium complexity forwarding, and a third tier (e.g., the ultra fast forwarding path 206), which is capable of handling medium-to-low complexity forwarding. With the MHSA scheme, the overall system throughput is no longer limited by the maximum performance of the SE and can take advantage of the forwarding capacity of the high-speed forwarding device(s), and the SE control plane may also be tightly integrated with the forwarding device control plane. Furthermore, the use of a hardware abstraction layer (HAL) and the control-plane integration API 208 to exchange messages between the master and slave entities may allow the master entity code and the resource manager code on the slave entity to reside on physically different devices. The MHSA approach encourages the implementation of direct communication protocols natively into the hardware so that messages may be directly exchanged between the high-speed forwarding devices and any higher level entity, such as the SE processor 210.

Moreover, hardware information (e.g., statistics) from the hardware tables of the high-speed forwarding device 110 may be exported to the SE processor 210 using a corresponding ABI such that this information may be reconciled with other SE data (e.g., statistics of non-offloaded packets). The information may be exported inside the payload of in-band packets generated by the high-speed forwarding device 110.

For some embodiments, the service engine may not reside within a chassis of the networking device 100 housing the high-speed forwarding device(s) 110. For example, the API/ABI approach may be utilized to enable integrated communication between an external dedicated firewall appliance, such as the PIX (Private Internet Exchange) from Cisco Systems, Inc., and a high-speed forwarding device.

One possible embodiment of the MHSA scheme may be realized on the Catalyst 6500, or on a similar networking device. For such embodiments, a service module, such as the Firewall Services Module (FWSM) or the Application Control Engine (ACE) service module, may gain direct control over the switch hardware according to the MHSA approach, including the ABI/API scheme and the messaging technique. The ABI/API scheme may allow the SE's control plane to partially integrate with the FD control plane, while the messaging technique may allow the SE's processors to send direct messages to the high-speed forwarding device. Additionally, the API/ABI would allow an SE to control the export of the statistics information from the hardware to the blade under the supervision of the switch control plane.

In the Catalyst 6500 implementation above, the FD control plane may act as a relay and translation agent whenever the SE and the hardware cannot speak to each other directly. The FD control plane may also function as a resource manager and consistency enforcer. However, for other embodiments, the MHSA idea may comprise the implementation of direct communication protocols natively into the hardware so that messages may be directly exchanged between the high-speed forwarding device and any higher level entity, such as the SE processor 210. In general, depending on the specific capabilities of the hardware, direct SE-to-FD communication may be possible or a message translation and relay service may be provided by the FD control plane.

Such integration techniques are not limited to high-speed switch hardware, but may also be applied to other types of hardware resources, such as quality of service (QoS) tables, NetFlow tables for collecting statistics on network traffic that flows through a forwarding device, access control list (ACL) tables for security, adjacency tables, packet-based or byte-based policer tables, fault management (FM) modules, service modules, and policy feature cards (PFCs).

An Example Supervisor/Service Module Integration

Figure 3:
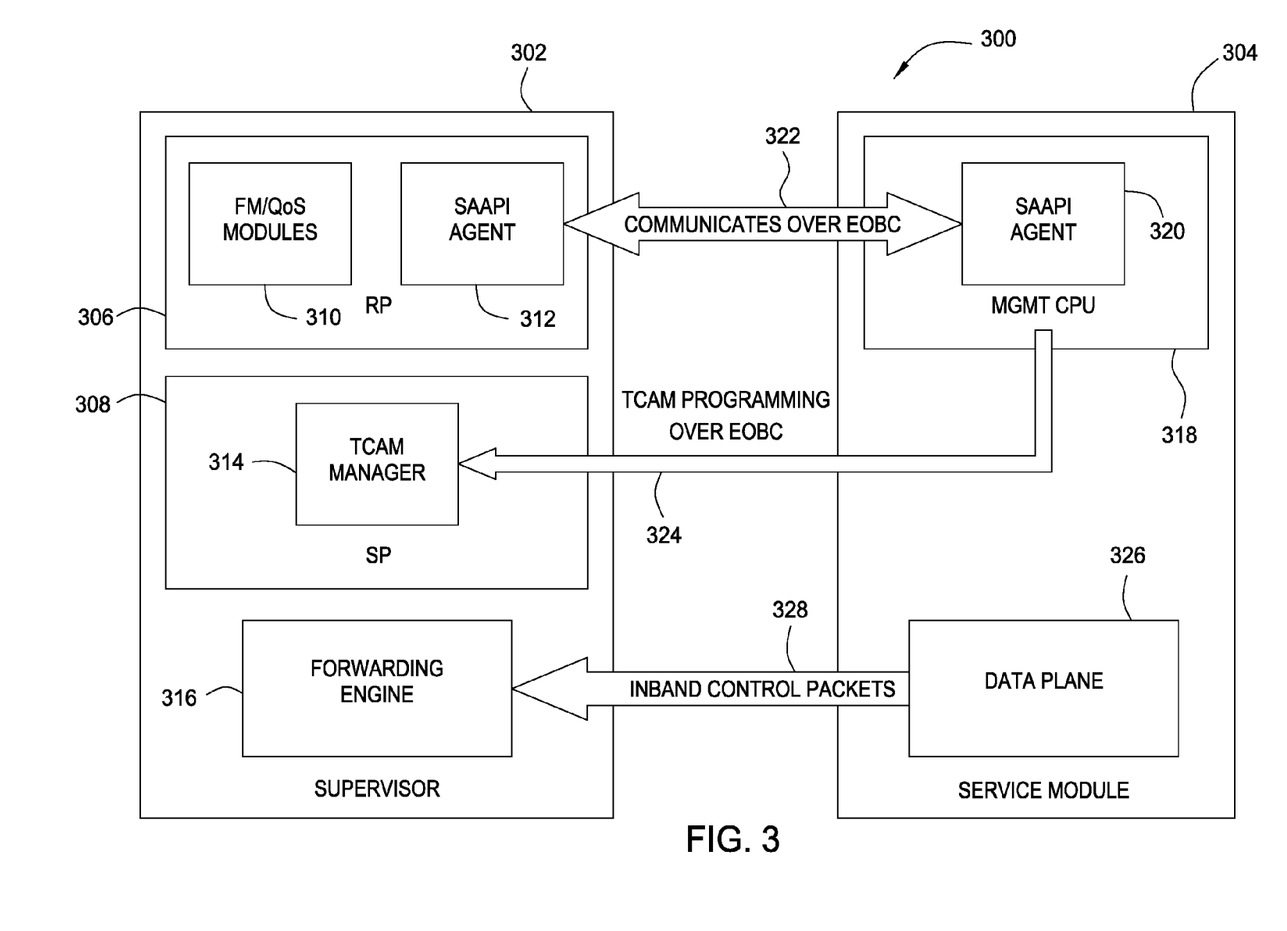
FIG. 3 illustrates a block diagram of a supervisor communicating with a service module through in-band and out-of-band channels, in accordance with an embodiment of the present invention.

As an example of implementing the MHSA approach, FIG. 3 illustrates a block diagram 300 of a supervisor 302 communicating with a service module 304 through in-band and out-of-band channels. The control plane of the supervisor 302 may comprise a route processor (RP) 306 and a switch processor (SP) 308. The RP 306 may provide Layer 3 functionality and control the forwarding table (e.g., the Cisco Express Forwarding, or CEF, table) such that all routing takes place in hardware. The RP 306 may comprise one or more service modules, such as a frame management (FM) and Quality of Service (QoS) module 310, and a service acceleration API (SAAPI) agent 312. The SAAPI agent 312 may contain the ABI for efficient communication between the hardware devices as described above. The SP 308 may control system operation, port management, and services such as spanning tree protocol (STP), virtual local area networks (VLANs), VLAN trunking protocol (VTP), and Internet Group Management Protocol (IGMP). The SP 308 may contain TCAM manager logic 314 for TCAM programming with high-speed lookups for flow entries. The supervisor 302 may also contain a forwarding engine 316 for routing network traffic.

The service module 304 may comprise a management CPU 318 or other suitable processor as part of the service module's control plane. The management CPU 318 may comprise a SAAPI agent 320 corresponding to the RP's SAAPI agent 312. The SAAPI agents 312, 320 may communicate using an Ethernet out-of-band control (EOBC) channel 322, which may be a bus for some embodiments. TCAM programming may also be performed over an EOBC channel 324 from the management CPU 318 to the TCAM manager logic 314. Furthermore, the service module 304 may comprise a data plane 326, which may use an in-band channel 328, such as a data bus, to send certain control packets and offload certain network flows to the supervisor 302 for the forwarding engine 316 to handle.

The supervisor 302 and the service module 304 may both be master devices for different types of traffic portions. For example, network traffic, as well as the corresponding forwarding and processing resources, that is to be just on Layer 2 (L2, the data link layer of the Open Systems Interconnection Reference Model, or OSI model) or Layer 3 (L3, the network layer) switched may be controlled by the supervisor's processor/control plane. In contrast, network traffic to which a certain service is to be applied (along with the corresponding forwarding and processing resources) may be controlled by the control plane (e.g., the management CPU 318) of the service module 304.

According to MHSA, two hardware devices, such as the supervisor 302 and the service module 304, may possess a means to "negotiate" who is to be the master and then to partition the hardware's forwarding and processing resources accordingly. Therefore, mastership may be a dynamic and negotiable property according to MHSA, and traffic forwarding speed may be affected by which resources are allocated by the corresponding master to perform a certain operation. For some embodiments, ownership may be determined by checking whether the traffic is to be L2/L3 switched or if the traffic indicates higher-level and more complex services than L2/L3 switching.

Example Forwarding Decision Operations

Figure 4:
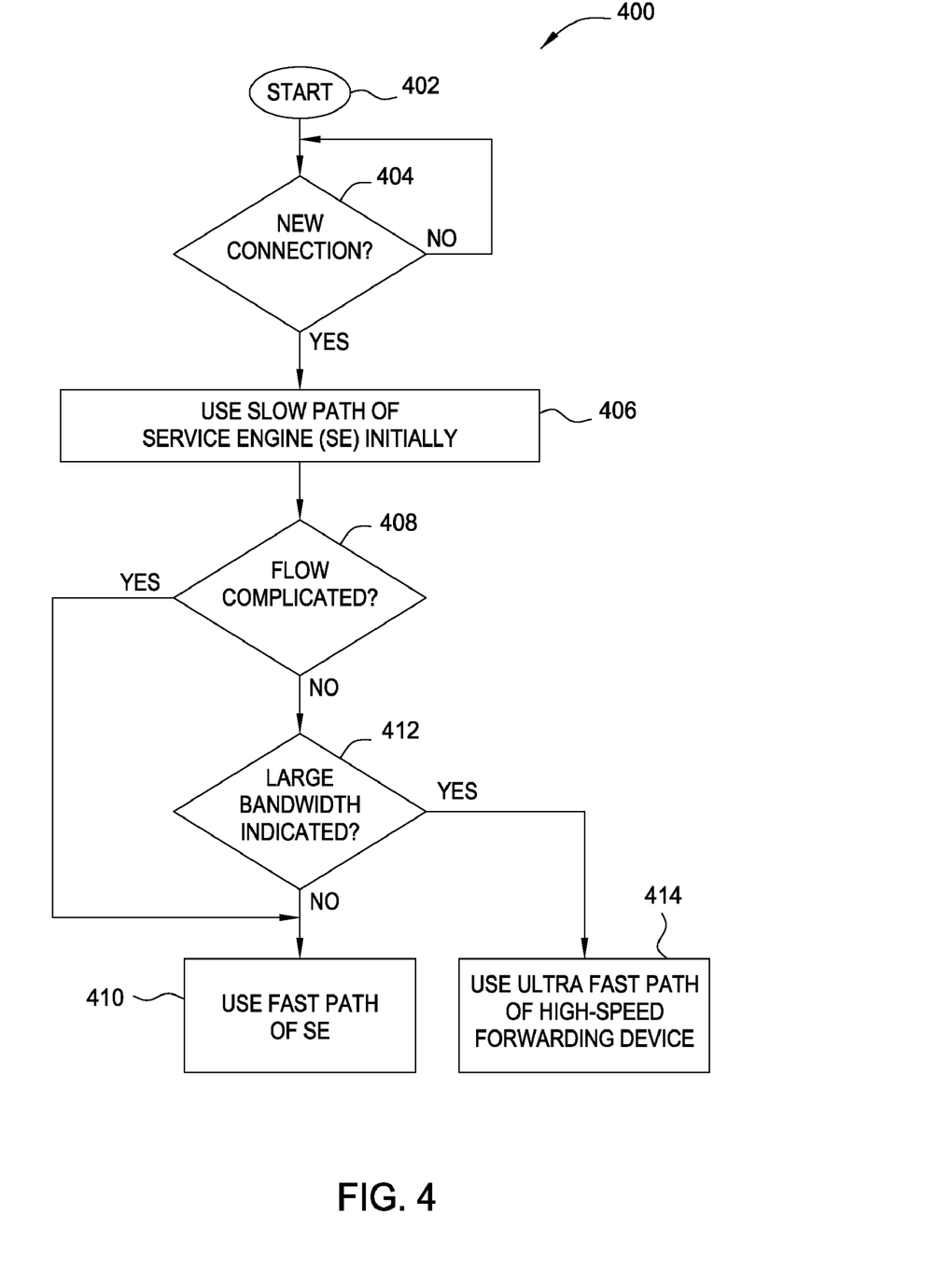
FIG. 4 is a flow diagram of example operations for making a forwarding decision to use an ultra fast path of the high-speed forwarding device or a fast path of the SE for a new network connection, in accordance with an embodiment of the present invention.

FIG. 4 illustrates a flow diagram of example operations 400 for making a forwarding decision to use a fast path of the SE or an ultra fast path (i.e., a wire-speed path) of the high-speed forwarding device for a new network connection. The operations 400 may begin at step 402. If this is not a new network connection as determined at step 404, the SE may wait until it recognizes a new network connection.

Once a new network connection is recognized at step 404, the flow-setup path (also known as the "slow path," relatively speaking) of the SE may be used initially at step 406 in an effort to handle network flow through the new connection. At step 408, the SE may determine whether the network flow for the new connection is complicated. If the network flow is complicated, then a forwarding decision may be made to create a shortcut in the SE's "fast path" and use the fast path for subsequent network flow for this particular connection at step 410.

In contrast, if the network is not complicated as determined at step 408, then at step 412, the SE may determine whether the new connection suggests using a large bandwidth. If a large bandwidth is not indicated at step 412, then a forwarding decision may be made to create a shortcut in the SE's "fast path" and use the fast path for subsequent network flow for this particular connection at step 410. If the new connection suggests using a large bandwidth at step 412, then a forwarding decision may be made to offload the network flow for this particular connection to the high-speed forwarding device and use the ultra fast path for subsequent network flow, thereby boosting performance for the networking device.

Conclusion

The MHSA approach described above is a novel mechanism that may be implemented with API/ABI/messaging techniques in an effort to significantly boost the performance of a networking device by offloading certain traffic processing (e.g., forwarding, accounting, encryption, traffic rewriting, traffic dropping, traffic buffering, etc.) to a high-speed slave device under full control of the SE control plane, thereby circumventing the SE's performance limitations in an effort to accelerate the traffic processing. Network equipment vendors selling service-enabled devices may use this idea to achieve higher performance and tighter integration between "dumb" forwarding devices and "smart" service-aware engines. While the ABI represents the communication language between the SE and the high-speed forwarding device, the API represents the management "glue" necessary to ensure control plane integration between such heterogeneous devices.

While the foregoing is directed to embodiments of the present invention, other and further embodiments of the invention may be devised without departing from the basic scope thereof, and the scope thereof is determined by the claims that follow.

The invention claimed is:

1. A device for network communication, comprising:
a high-speed forwarding device having a memory; and
a service engine (SE) coupled to the high-speed forwarding device and configured to handle network flows using both a fast path and a slow path, wherein the service engine offloads a portion of the network flows to be handled by the high-speed forwarding device, wherein the service engine controls the high-speed forwarding device over a service engine control plane in order to apply a forwarding and network policy to the offloaded portion of network flows handled by the high-speed forwarding device, wherein the service engine is configured to handle network flows using the slow path of the service engine initially for a new network connection until a forwarding decision is made, and wherein the high-speed forwarding device is configured to use an ultra fast path for network flows offloaded from the service engine, wherein the ultra fast path is faster than both the fast path and the slow path of the service engine, and wherein the service engine is configured to use the fast path for one or more of the network flows not offloaded to the high-speed forwarding device once the forwarding decision is made.

2. The device of claim 1, wherein the service engine offloads the portion of the network flows based on a parameter of the network flows.

3. The device of claim 2, wherein the parameter is at least one of bandwidth consumption, complexity, protocol, length, or transaction type.

4. The device of claim 1, wherein the offloaded portion of the network flows consume more bandwidth, are simpler, or are longer than a remaining portion of the network flows.

5. The device of claim 1, wherein the service engine is configured as a master and the high-speed forwarding device is configured as a slave to the service engine.

6. The device of claim 1, wherein the service engine comprises one of a service blade, a service appliance, an embedded service application specific integrated circuit (ASIC), or an embedded service processor.

7. The device of claim 1, wherein the high-speed forwarding device comprises a switch module.

8. The device of claim 1, wherein the high-speed forwarding device is housed within a chassis and the service engine is external to the chassis.

9. A method comprising:
using a slow path of a service engine (SE) for network flow of a new network connection, wherein the service engine is configured to handle network flows using the slow path of the service engine initially for the new network connection until a forwarding decision is made;
making the forwarding decision: (i) to use an ultra fast path of a high-speed forwarding device coupled to the service engine instead of the slow path for the network flow if the new network connection meets one or more criteria or (ii) to use a fast path of the service engine instead of the slow path if the new network connection does not meet the criteria; and wherein the ultra fast path is faster than both the fast path and the slow path of the service engine; and using the ultra fast path or the fast path for the network flow according to the forwarding decision, wherein the service engine controls the high-speed forwarding device over a service engine control plane in order to apply a forwarding and network policy to network flows using the ultra fast path of the high-speed forwarding device.

10. The method of claim 9, wherein the criteria of the network flow for the new network connection comprise at least one of bandwidth consumption, complexity, protocol, length, or transaction type.

11. The method of claim 9, wherein the forwarding decision is to use the ultra fast path for network flows that consume more bandwidth, are simpler, or are longer than for other network flows where the forwarding decision is to use the fast path.

12. The method of claim 9, wherein the service engine comprises one of a service blade, a service appliance, an embedded service application specific integrated circuit (ASIC), or an embedded service processor.

13. The method of claim 9, wherein the high-speed forwarding device comprises a switch module.

14. A computer-readable storage medium containing a program for determining a forwarding path for a new network connection, which, when executed by a processor, performs operations comprising:

using a slow path of a service engine (SE) for network flow of the new network connection, wherein the service engine is configured to handle network flows using the slow path of the service engine initially for the new network connection until a forwarding decision is made;

making the forwarding decision: (i) to use an ultra fast path of a high-speed forwarding device coupled to the service engine instead of the slow path for the network flow if the new network connection meets one or more criteria or (ii) to use a fast path of the service engine instead of the slow path if the new network connection does not meet the criteria; and wherein the ultra fast path is faster than both the fast path and the slow path of the service engine; and using the ultra fast path or the fast path for the network flow according to the forwarding decision, wherein the service engine controls the high-speed forwarding device over a service engine control plane in order to apply a forwarding and network policy to the offloaded portion of network flows handled by the high-speed forwarding device.

15. A computer-readable storage medium of claim 14, wherein the criteria of the network flow for the new network connection comprise at least one of bandwidth consumption, complexity, protocol, length, or transaction type.

16. A computer-readable storage medium of claim 14, wherein the forwarding decision is to use the ultra fast path for network flows that consume more bandwidth, are simpler, or are longer than for other network flows where the forwarding decision is to use the fast path.

17. A computer-readable storage medium of claim 14, wherein the service engine comprises one of a service blade, a service appliance, an embedded service application specific integrated circuit (ASIC), or an embedded service processor.

* * * * *